US007963211B2

(12) United States Patent
Feraille

(10) Patent No.: US 7,963,211 B2
(45) Date of Patent: Jun. 21, 2011

(54) RECIPROCATING GAS COMPRESSION INSTALLATION WITH CONTROLLED LEAKAGE RATE

(75) Inventor: Daniel Feraille, Joinville-le-Pont (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 721 days.

(21) Appl. No.: 11/816,504

(22) PCT Filed: Feb. 14, 2006

(86) PCT No.: PCT/FR2006/050133
§ 371 (c)(1),
(2), (4) Date: Apr. 17, 2008

(87) PCT Pub. No.: WO2006/087493
PCT Pub. Date: Aug. 24, 2006

(65) Prior Publication Data
US 2009/0114086 A1    May 7, 2009

(30) Foreign Application Priority Data
Feb. 17, 2005   (FR) ..................................... 05 50446

(51) Int. Cl.
*F16J 15/00*   (2006.01)
*F16K 41/00*   (2006.01)
(52) U.S. Cl. ........................................................ 92/168
(58) Field of Classification Search ..................... 92/168
See application file for complete search history.

(56) References Cited

U.S. PATENT DOCUMENTS
2,131,927 A * 10/1938 Wenzel .......................... 277/514
(Continued)

FOREIGN PATENT DOCUMENTS
EP          0434510          6/1991
(Continued)

OTHER PUBLICATIONS
International Search Report for PCT/FR2006/050133.
(Continued)

*Primary Examiner* — Thomas E Lazo
(74) *Attorney, Agent, or Firm* — Elwood L. Haynes

(57) ABSTRACT

The invention relates to a reciprocating installation (1) for the compression of a current gas, comprising: at least one cylinder (2) which defines a compression chamber (3); a piston (4) which co-operates with the cylinder, an actuation rod (6) extending from said piston; a cylinder base (7) comprising a passage (8) for the linear and reciprocating displacement of the piston rod; and a stuffing box-type sealing device (9) between the piston rod (6) and the cylinder base (7). The invention is characterized in that: a source (16) that provides a pressurized insulating gas of no interest is used; the sealing device stack comprises two spacer rings (111, 112), namely a front ring (111) which is disposed at a distance from the cylinder and a rear ring (112) which is disposed nearer the cylinder; and the cylinder base or the body of the sealing device (7) is equipped with a front hole (151) and a rear hole (152), such that, on one side, the two holes are communicated with two external peripheral cells (141, 142) in the two spacer rings respectively and, on the other side, at least the front hole (151) is communicated with the insulating gas source (16), such as to use an internal annular gap in order to generate a tubular insulating gaseous path comprising the insulating gas along the length of the piston rod (6) practically from one end of the sealing device (9) to the other.

3 Claims, 2 Drawing Sheets

U.S. PATENT DOCUMENTS

Figure 1:
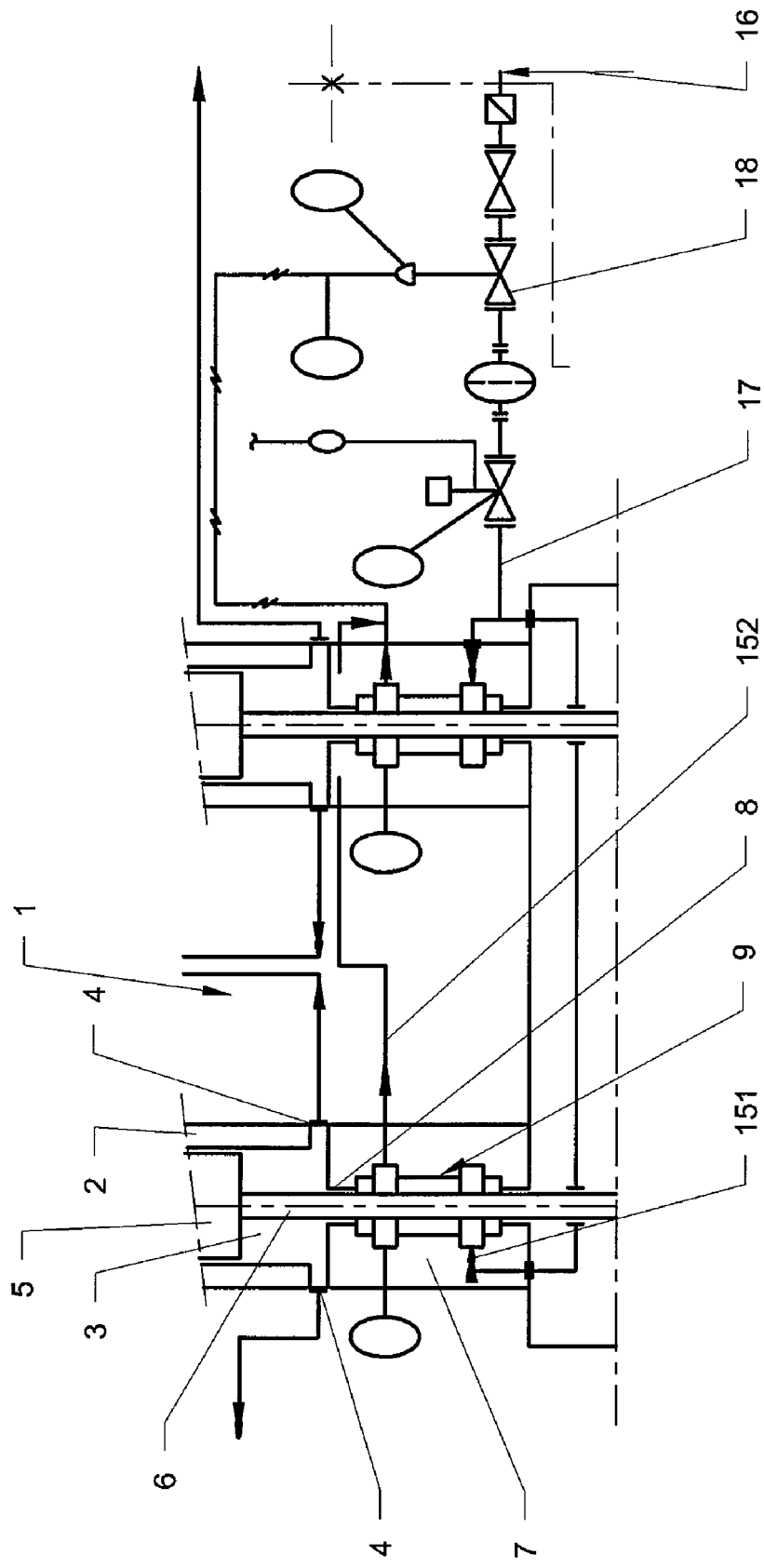

| | | | |
|---|---|---|---|
| 2,684,274 A | | 7/1954 | Saxon |
| 3,834,715 A | | 9/1974 | Butler |
| 4,005,580 A | * | 2/1977 | Swearingen ................. 277/432 |
| 4,480,842 A | * | 11/1984 | Mahyera et al. .............. 277/516 |
| 5,132,055 A | | 7/1992 | Alleaume et al. |

FOREIGN PATENT DOCUMENTS

| | | |
|---|---|---|
| EP | 0665042 | 8/1995 |
| FR | 0 993 505 | 11/1951 |
| FR | 0993505 | * 11/1951 |
| FR | 1 042 989 | 11/1953 |
| FR | 2 209 432 | 6/1974 |
| GB | 0 554 094 | 6/1943 |
| WO | 9934907 | 7/1999 |

OTHER PUBLICATIONS

Written Opinion for PCT/FR2004/050501.

* cited by examiner

RECIPROCATING GAS COMPRESSION INSTALLATION WITH CONTROLLED LEAKAGE RATE

This application is a 371 of International PCT Application PCT/FR2006/050133, filed Feb. 14, 2006.

The present invention relates in general to the compression of a gas known as a useful gas, which is therefore of interest, as defined hereinafter, using a compressor of the reciprocating type.

More specifically, at each cylinder in a compression installation or machine, the invention is concerned with controlling the rate at which the useful gas leaks, there being, of necessity, a leak between the piston rod and the cylinder.

It will in fact be recalled that, in spite of the existence of sealing devices described hereinbelow, the clearance there is between the piston rod which moves back and forth in a reciprocating translational movement, and the seals, causes a residual leakage flow to the outside, albeit as small as possible, that needs to be controlled, in particular to prevent it from being discharged in that state into the atmosphere or into the immediate surroundings of the compression machine.

The prior art already discloses an installation or machine for the reciprocating compression of a gas of interest, conventionally comprising:
  at least one elementary cylinder determining a compression chamber provided with at least one intake and at least one outlet for the compressed useful gas, a piston collaborating with the cylinder, with an operating rod emerging therefrom;
  a cylinder end comprising a passage through which the piston rod can pass in a linear and reciprocating manner;
  a sealing device, of the stuffing-box type, sealing between the piston rod and the cylinder end, with respect to the useful gas; conventionally, such a device comprises a stack along the axis of the piston of, on the one hand, annular packings and, on the other hand, at least one insert ring, which performs no sealing function with respect to the piston rod and is configured in various ways to form a radial passage from an internal annular gap adjacent to the piston rod to at least one external peripheral cavity, as appropriate formed or defined with at least one adjacent annular packing, the packings and insert ring(s) being tightly packed against one another in the direction of the cylinder by a stuffing-box gland; conventionally, each intermediate packing comprises a cup forming a housing for a seal, packed or compressed by appropriate means bearing against the internal edge of the cup and affording two types of seal, one against the piston rod and the other against the end of the cup of the immediately adjacent packing or an insert plate;
  one or more ports formed in the cylinder end or in the body of the sealing device and communicating in a sealed manner with the external peripheral cavity or cavities of the respective insert rings.

With such a construction, as the installation operates, given in particular the gradual wear of the seals, a leakage path for useful gas becomes established along the piston rod, towards the outside of the cylinder, the useful gas passing along said path from the delivery pressure to the pressure outside the cylinder and at the cylinder end. Conventionally, in order to limit the amount of useful gas escaping to the outside from the sealing device, one or more insert rings, in register with one or more ports formed in the cylinder end or in the body of the sealing device, staged along the length of the piston rod, on the anterior side, that is to say the side furthest from the cylinder, collect the leakage gas, consisting of useful gas, at a pressure below the delivery pressure either in order to recycle it to the delivery side of the compression chamber or into an earlier cylinder, or to remove it to outside the installation.

That being the case, as the seals (packings) gradually wear, the rate at which the gas leaks increases, without the gas flow recovered by the aforementioned ports being able to increase substantially because of the pressure drop inherent to the circuit for recycling or removing the leakage gas from the installation. As a result, the residual rate of flow of useful gas leaving the cylinder through the sealing device is never zero, and increases gradually as the seals become worn.

For various reasons, particularly for safety and environmental reasons, it is not permissible for this residual gas flow to be discharged directly into the atmosphere.

It is therefore necessary for the compression installation to be built in such a way that there is a casing which forms, between the cylinder/cylinder end and the outside, by virtue of one or more partitions through each of which the piston rod passes, one or more sealed intermediate chambers each able to recover the residual flow of useful gas and control it, particularly in terms of its low pressure, although this pressure is higher than atmospheric pressure, its destination and any treatment it might require. The only or last intermediate chamber may, in particular, be used to house any device needed to lubricate the piston rod.

Further, after the manner of the sealing device present on the cylinder end or in the body of the sealing device, each internal or intermediate partition, and possibly each external partition, has another sealing device also with the structure or construction of a stuffing box, and positioned inside the intermediate chamber concerned.

These various sealing devices form so many sealing stages from the cylinder towards the outside.

For various reasons, particularly concerned with the price or cost of the useful gas, it is essential to limit the residual flow of gas escaping the piston/cylinder end sealing device. To do this, the use of a pressurized barrier gas, for example nitrogen, injected into the various sealing stages described above and in the following way has already been described and proposed:
  injecting the barrier gas, into the sealing device, in the last or only intermediate chamber;
  injecting the same barrier gas into the cylinder end sealing device;
  the barrier gas flowing as appropriate through the sealing device over the partition separating two intermediate chambers,
by means of which the barrier gas is recovered in one intermediate chamber, as a mixture with the useful gas escaping from the cylinder/cylinder end, and possibly with the barrier gas removed from the sealing device on the cylinder/cylinder end, to be removed from the installation, for example to a flare.

In practice, the aforementioned injections/ejections are obtained by construction, in the same way as before, each by virtue of a ring inserted into the stuffing box in communication with a port in the cylinder end or in the body of the sealing device.

In this lies the complexity of the corresponding compression installation. Furthermore, some of the useful gas still escapes the cylinder/cylinder end sealing device and is lost forever because it is mixed in with the barrier gas.

It is an object of the present invention to overcome the aforementioned disadvantages.

According to the present invention, in collaboration:
(a) there is a source of insulating gas, which is not of interest but is under pressure;
(b) the stack (of the stuffing-box type) of the cylinder/cylinder end sealing device comprises two insert rings, one known as the anterior ring, some distance from the cylinder, and the other, known as the posterior ring, closest to the cylinder;
(c) the cylinder end or the body of the sealing device has two ports, one termed the anterior port and the other termed the posterior port, in communication, on one side, with the two external peripheral cavities of the two insert rings, namely the anterior and posterior rings respectively, and, on the other side, at least in the case of the anterior port, with the source of insulating gas, by means of which, during operation, a tubular insulating gas path for the insulating gas is generated from an internal annular gap between the anterior insert ring and the piston rod, along the piston rod practically from one end of the sealing device to the other.

By virtue of the invention, in the cylinder/cylinder end sealing device, the leakage gas stream which according to the prior art consisted of useful gas of interest, is essentially replaced by the stationary tubular gas path for the insulating gas which is not of interest.

In consequence, there is absolutely no need to recover some of the leakage gas stream, at some intermediate level in the sealing device, in order to remove or recycle it.

Further, the residual gas escaping from the sealing device essentially consists of the insulating gas, which is not of interest, and which may in particular and in addition be chosen for its harmlessness towards the environment, or the lack of danger it presents to the compression machine or its environment.

Furthermore, in certain cases, by virtue of the invention, it becomes possible to limit the partitioning between cylinder and casing to one single sealed intermediate chamber.

The terms "interest" and "not of interest" are to be understood, in general and relative terms, that the gas termed the useful gas, also called the "process gas", has an economic value, being, for example, oxygen, methane, hydrogen, etc., whereas the gas termed the insulating gas has practically none, aside from the cost of sourcing it, or in any case has a lower economic value than the so-called useful gas and is, for example, nitrogen or air.

The useful gas and the insulating gas are chosen as a function of one another, it being understood that the insulating gas has also to meet other considerations, including:
  it needs to be inert and non-reactive with respect to the useful gas and/or with respect to the various parts, including oils and grease, of the compression machine.
  it has to present no danger, or needs to be innocuous, with respect to the environment and operators, etc.; for example, it is a gas that is not corrosive, not explosive, not an oxidizing agent or not flammable or not toxic.

Figure 2:
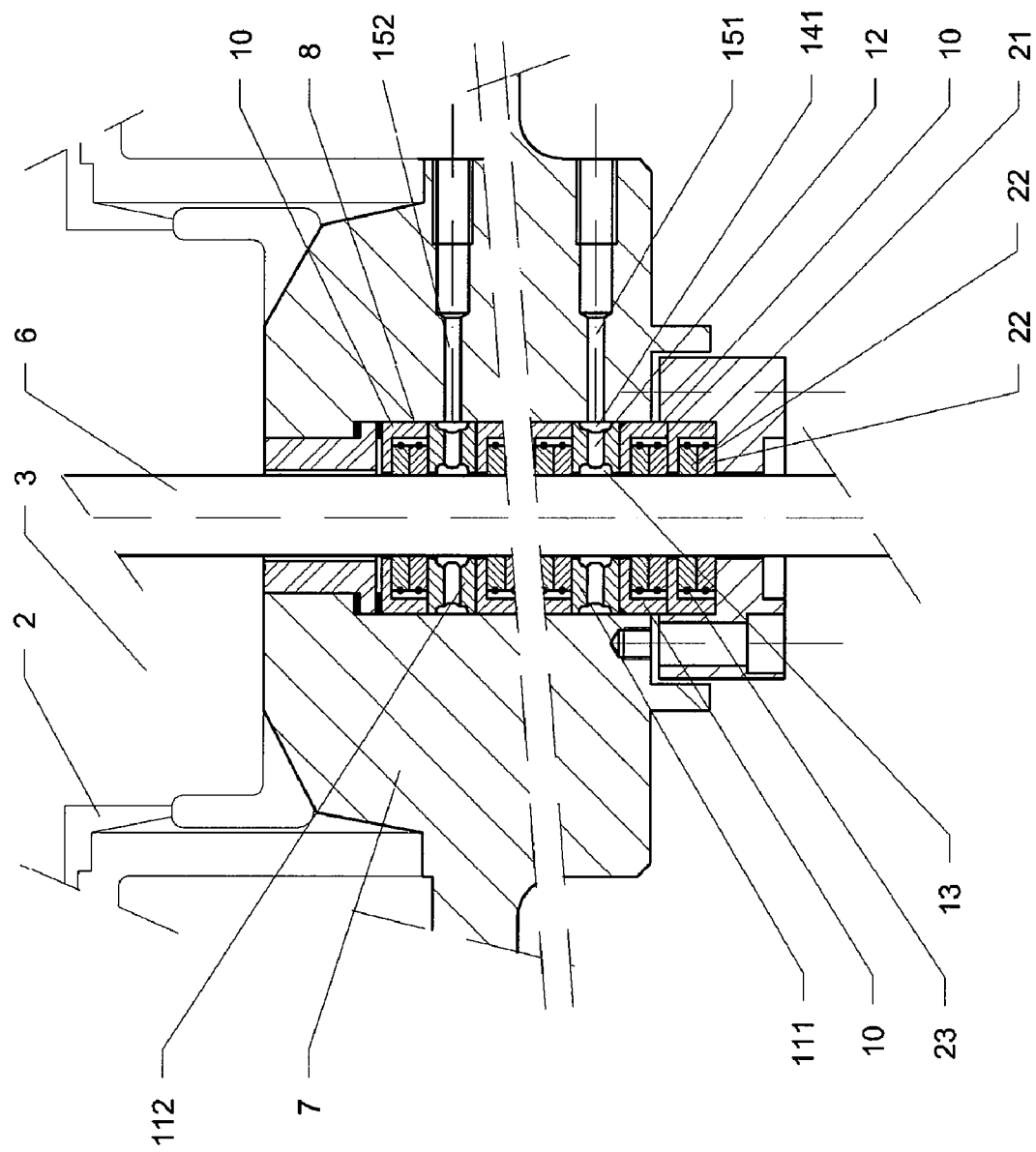

The present invention is now described with reference to the attached drawing in which:

FIG. 1 schematically depicts a compression machine or installation of the reciprocating type incorporating a sealing device according to the invention;

FIG. 2 depicts, by way of example, a sealing device according to the invention, in place on a cylinder/cylinder end of a machine according to FIG. 1.

According to FIGS. 1 and 2, a compression machine or installation 1 of the reciprocating type, or useful gas comprises:
  at least one cylinder 2 determining a compression chamber 3 provided with at least one intake (not depicted) and at least one outlet 4 for delivering the compressed useful gas; a piston 5 collaborating with the cylinder 2, with an operating rod 6 emerging from said cylinder;
  a cylinder end 7 comprising a passage 8 through which the piston rod 6 can pass in a reciprocating translational movement;
  a sealing device 9, of the stuffing-box type, sealing between the piston rod 6 and the cylinder end 7 with respect to the useful gas and comprising a stack along the axis of the rod 6 of, on the one hand, a multitude of annular packings 10 and, on the other hand, two insert rings 111, 112 each designed to form a radial passage 12 from an internal annular gap 13 adjacent to the piston rod 6 to at least one external peripheral cavity 141 or 142 adjacent to the internal face of the passage 8 in the cylinder end or in the body of the sealing device 7;
  two ports 151 and 152 formed in the cylinder end or in the body of the sealing device 7, communicating in a sealed manner with the external peripheral cavities of the respective insert rings 111 and 112 of the sealing device 9.

As depicted in FIG. 2, each annular packing 10 comprises a cup 21 forming a housing for a single seal or two superposed seals 22 packed or compressed by appropriate means, in this instance annular or axial springs 23 bearing against a surface of the cup 21. These seals 22 in practice perform two sealing functions, sealing against the piston rod 6 and sealing against the end of the cup 21 of the immediately adjacent packing 10, or corresponding insert plate.

According to the present invention and as already stated above, in collaboration:
(a) there is a source 16 of insulating gas, which is not of interest but is under pressure;
(b) the stack of the sealing device 9 comprises the two insert rings 111, 112, one of them termed the anterior ring 111, some distance from the cylinder 2, and the other termed the posterior ring 112, closest to said cylinder;
(d) in register, the cylinder end or the body of the sealing device 7 has the two ports 151 and 152, one of them termed the anterior port 151 and the other termed the posterior port 152, which are formed in communication, on one side, with the two external peripheral cavities 141, 142 of the two insert rings 111 and 112 respectively, termed the anterior and posterior rings, and, on the other side, at least in the case of the anterior port 151, with the source 16 of pressurized insulating gas.

In consequence, during operation, thanks to the aforementioned measures, a tubular insulating gas path essentially consisting of the insulating gas is generated from the internal annular gap 13 there is between the piston rod 6 and the insert ring 111, along the piston rod 6 practically from one end of the sealing device 9 to the other.

As shown by figure FIG. 1, the installation further comprises a supply circuit 17 communicating from the source 16 of insulating gas with the aforementioned anterior port 151, and a control valve 18 for controlling the pressure of the aforementioned insulating gas path, dependent on the pressure obtaining at the outlet of the aforementioned posterior port 152.

As a preference, the gas pressure in the insulating gas path is set to a value lower than the intake pressure at which gas is let into the compression chamber 3, the purpose of this being to limit the extent to which the insulating gas passes towards the cylinder 2.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A reciprocating compression installation (1) for compressing a useful gas, comprising:
    at least one cylinder determining a compression chamber provided with at least one intake and at least one outlet for the compressed useful gas; a piston collaborating with the cylinder, with an operating rod emerging therefrom;
    a cylinder end a passage through which the piston rod can pass in a linear and reciprocating manner;
    a sealing device, of the stuffing-box type, sealing between the piston rod and the cylinder end, with respect to the useful gas, comprising a stack along the axis of the rod, of the stuffing-box type, of, on the one hand, a multitude of annular packings and, on the other hand, at least one insert ring designed to form a radial passage from an internal annular gap adjacent to the piston rod to at least one external peripheral cavity adjacent to the internal face of the passage in the cylinder end or in the body of the sealing device; and
    at least one port formed in the cylinder end or in the body of the sealing device and communicating in a sealed manner with the cavity of the sealing device;
    wherein, in collaboration:
    a) there is a source of insulating gas, which is separate from the useful gas but is under pressure;
    b) the stack of the sealing device comprises two insert rings, one of them, the anterior ring, some distance from the cylinder, and the other, the posterior ring, closest to said cylinder; and
    c) the cylinder end or the body of the sealing device has two ports, an anterior port and a posterior port, which are formed in communication, on one side, with the two external peripheral cavities of the two insert rings, namely the anterior and posterior rings respectively, and, on the other side, at least in the case of the anterior port, with the source of insulating gas so as to generate, from an internal annular gap, a tubular insulating gas path for the insulating gas, along the piston rod, practically from one end of the sealing device to the other.

2. The installation of claim 1, wherein it comprises a supply circuit communicating, from the source of insulating gas, with the anterior port, and a control valve for controlling the pressure of the insulating gas path, dependent on the pressure obtaining at the outlet of the posterior port.

3. The installation of claim 1, wherein the gas pressure of the insulating gas path is set to a value lower than the intake pressure at which gas is let into the compression chamber.

* * * * *